Dec. 20, 1955  G. R. GITTER  2,727,310
CONTOUR GAGE FOR WAVE GUIDES
Filed Sept. 7, 1950  2 Sheets-Sheet 1
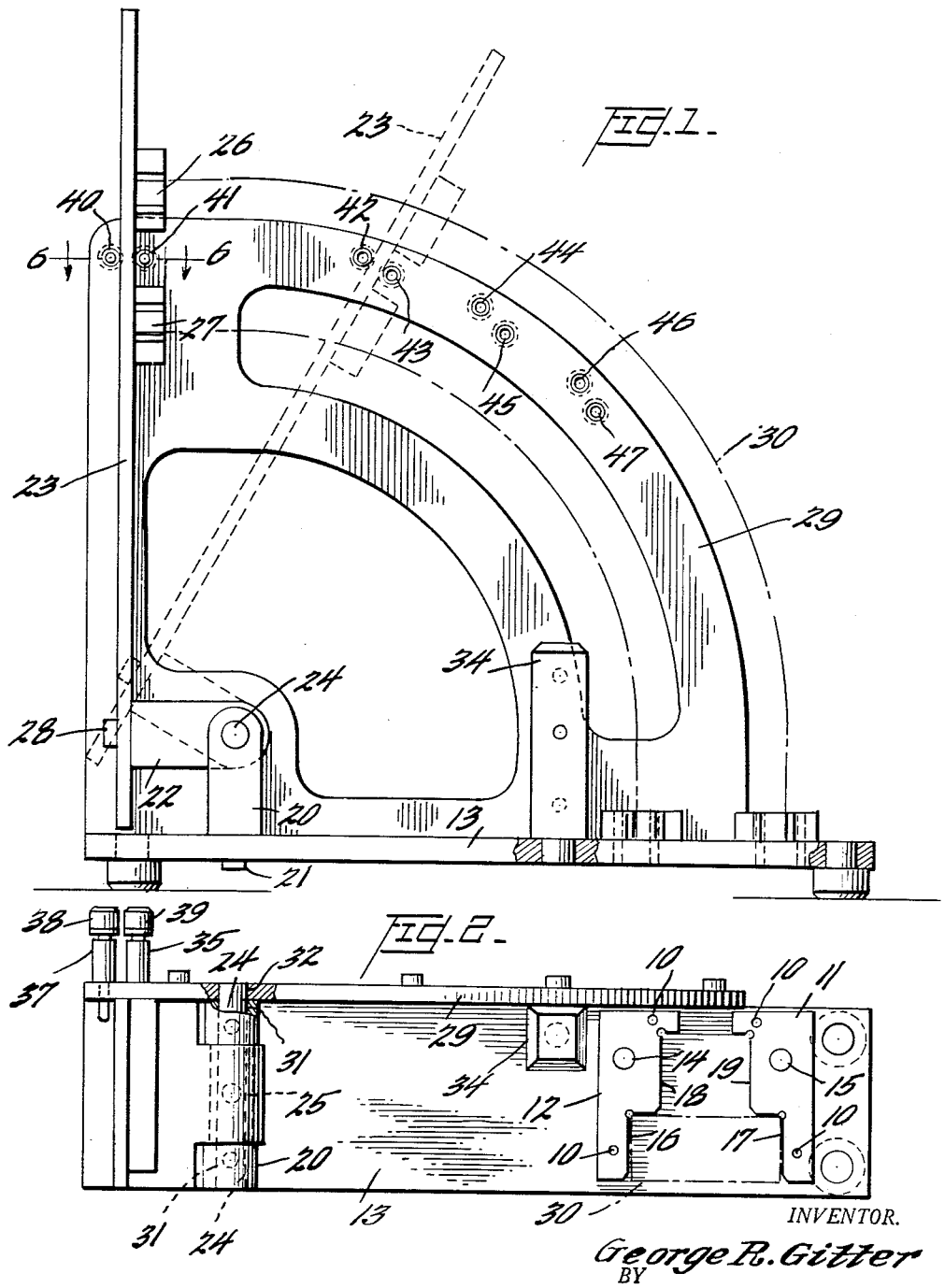
INVENTOR.
George R. Gitter
BY
C. B. Hamilton,
Attorney

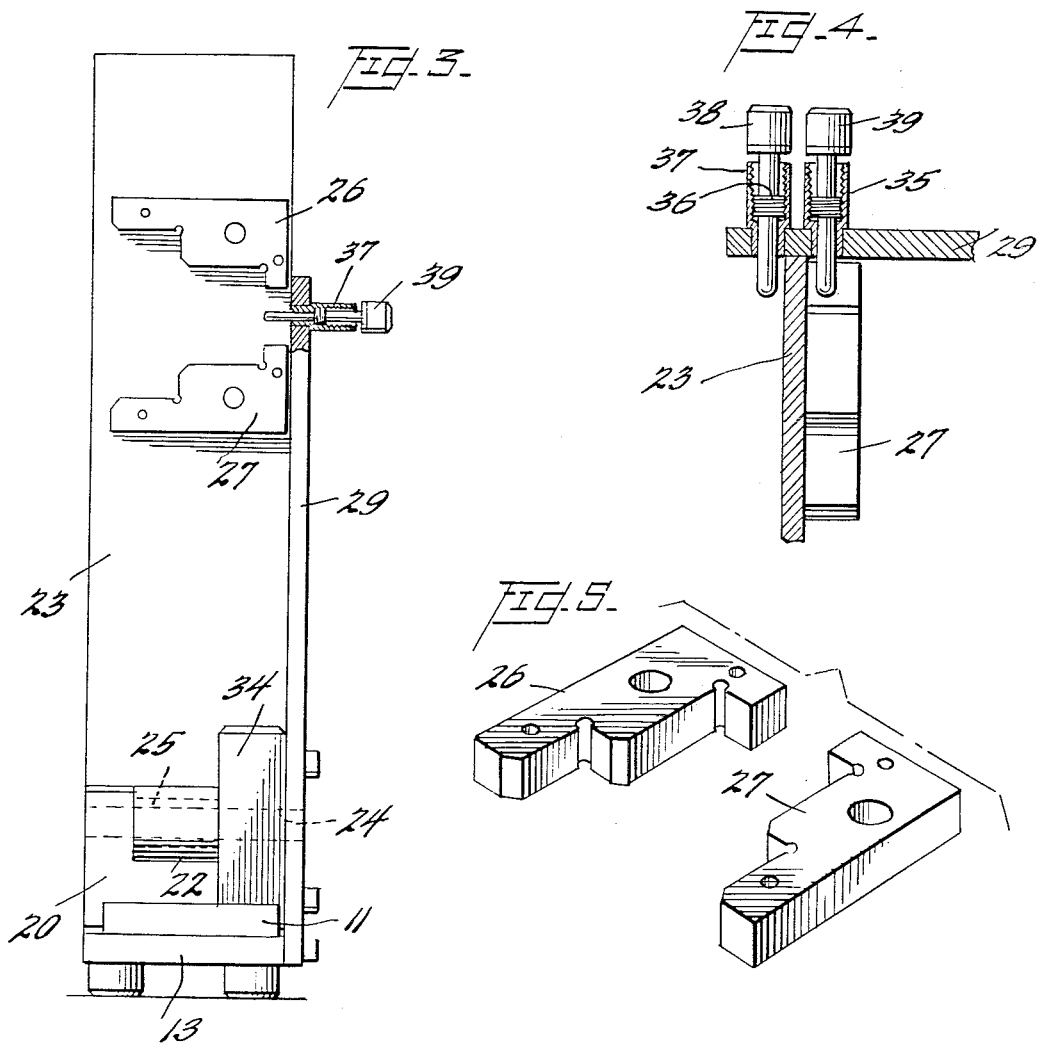

United States Patent Office 2,727,310
Patented Dec. 20, 1955

2,727,310

CONTOUR GAGE FOR WAVE GUIDES

George R. Gitter, Winston-Salem, N. C., assignor to Western Electric Company, Incorporated, New York, N. Y., a corporation of New York Application September 7, 1950, Serial No. 183,583

10 Claims. (Cl. 33—174)

This invention relates to contour gages, and more particularly to a device for ascertaining the accuracy of the length and angle of curvature of a section of a conventional wave guide used in the propagation of ultra-high frequency electrical radiations.

It is a prerequisite in bending wave guides that care must be taken to insure that the required angle of bend is accurately produced and that the length of the section is correct. Otherwise, an imperfect fit between succeeding sections of the wave guide will result, with subsequent loss of energy causing a distorted radiation pattern.

An object of this invention is to provide an instrument which will accurately gage the length and the angle of bend or contour of a wave guide section.

Another object is the provision of an easily adjusted device for measuring the length and the angle of curvature of a wave guide section for all of the different angles which are commonly used in the art.

With these and other objects in view, the invention comprises an instrument having a base plate containing removable gage blocks for holding one end of a wave guide in aligned position and a pivoted gage arm which may be secured by a pair of removable pins in any of a plurality of desired measured postions depending upon the angle of curvature of the wave guide. The gage arm also contains removable blocks which contact the free end of the wave guide.

Other objects and advantages will be apparent from the following detailed description when taken in conjunction with the drawings, wherein Fig. 1 is a front elevational view of a device illustrating one embodiment of the invention;

Fig. 2 is a top plan view thereof;

Fig. 3 is an end view thereof;

Fig. 4 is a fragmentary cross sectional view taken along section 6—6 of Fig. 1 and showing the position of the locking pins in locking the movable gage arm in position; and Fig. 5 is an enlarged perspective view of the gage blocks shown in Fig. 3.

Referring now to the drawings, removable gage blocks 11 and 12 of any desired contour are fastened to a base 13 by machine screws 14 and 15 and held in position by dowels 10. The wave guide 30 to be gaged consists of a pair of straight end sections with a curved section in the form of a circular arc between the end sections. One of the end sections of the wave guide 30 is positioned between the gage blocks 11 and 12.

A variety of types of waves may propagate within a wave guide. It is well known that there exists within a properly terminated wave guide an electric and a magnetic field. If the electric field has a component in the direction of propagation then the magnetic field does not, and the converse is also true. Modes of transmissions having a component of electric field in the direction of propagation but no component of magnetc field in that direction are known as E waves, and those having only a component of magnetic field in the direction of propagation are known as H waves. Hence, all modes of transmission may be classified in the two groups, H and E, depending upon the axial component of the field that exists. In rectangular wave guides the modes of transmission depend upon the cross-sectional dimensions of the wave guide. Therefore, in a gage for rectangular wave guides, it will be necessary to provide means for determining the accuracy of the angle of curvature of the wave guide for both the E and H waves depending upon which is used as the mode of propagation.

If E waves are being used, the straight end portion of the wave guide 30 to be measured is placed on the base 13 between the gage blocks 11 and 12 so that their gauging surfaces 18 and 19 contact the sides of the wave guide. If H waves are employed the wave guide is positioned so that gauging surfaces 16 and 17 of the gage blocks contact the sides of the wave guide. Thus the contour gage may be used for either the E or H mode of transmission.

An arcuate plate 29 containing apertures 40 through 47 is fastened to the base 13. A bifurcated upright stud 20 having aligned apertures 31 is secured to the base 13 by machine screws 21. Dowel 24 extends through an aperture 32 in plate 29 and through the aligned apertures 31 in the upright stud 20. An offset stud 22 is rotatably mounted on bushing 25 which is placed between the bifurcated forks of the upright stud 20 surrounding the dowel 24. Gage arm 23 containing removable gage blocks 26 and 27 is secured to offset stud 22 by machine screw 28.

The distance between base 13 and the center of dowel 24 is exactly the same as the length of the straight end section of the wave guide 30 which is positioned between gage blocks 11 and 12. The distance between gage arm 23 and the center of dowel 24 likewise is exactly equal to the length of the other straight end section of the wave guide. Hence, the wave guide will consist of the two straight end sections and a section in the shape of an arc of a circle the center of curvature of which is at the center of dowel 24.

The apertures 40 through 47 are accurately located in the plate 29 in order to effectively gage both the contour and the length of the wave guide section. Apertures 40 and 41 are located at the exact position which will enable the device to gage wave guide sections having a 90° angle of curvature and likewise apertures 42 and 43 are provided for the 60° position, 44 and 45 for the 45° position, and 46 and 47 for the 30° position. It is necessary that the apertures be accurately positioned at a predetermined distance above the base 13 as well as at predetermined angles so that the gage will determine length as well as contour of a wave guide section.

Referring now to Fig. 4, a threaded portion 36 of pin 38 is adapted to intermesh with the internally threaded sleeve 37 which fits tightly within any of the predetermined holes 40 through 47 in the plate 29.

If the desired angle of curvature of the wave guide is 90°, pins 38 and 39 are placed with sleeves 35 and 37 in holes 40 and 41 of the plate 29 so that the gage arm 23 is held between the pins. The straight end section of the wave guide 30 will fit tightly between the gage blocks 26 and 27 if the length is correct and the angle of curvature is exactly 90°. If the angle of curvature is not exactly 90° or if the length is incorrect, the end section of the wave guide 30 will not fit between the gage blocks 26 and 27 and the wave guide section will be rejected. Gage blocks 26 and 27 are identical in size and shape to gage blocks 11 and 12 and will serve as a gage for either the H or E plane mode of transmission by properly positioning the wave guide 30 between the gage blocks 11 and 12 as explained previously.

If the desired angle of curvature is 60°, the pins 38 and 39 and the sleeves 35 and 37 may be removed from holes 40 and 41 and the gage arm 23 will be free to rotate. The gage arm 23 is rotated to the 60° position and pins 38 and 39 and sleeves 35 and 37 are placed in holes 42 and 43, so that the pins again extend on opposite sides of the gage arm 23 to hold it in position. If the angle of curvature of the wave guide 30 is exactly 60° and the length is correct, the straight end section of the wave guide will fit snugly between gage blocks 26 and 27. If such a fit does not result, the angle of curvature is not 60° or the section is not of proper length and the section of the wave guide is discarded as faulty.

This operation may be repeated for the 45° position between holes 44 and 45 in sine plate 29 and for the 30° position between holes 46 and 47.

The stud 22 serves as an offset so that the straight portion of the wave guide will contact the surfaces of the gage blocks 26 and 27 along the entire surface. The straight portion of the wave guide will thus be perpendicular to the gage arm 23 at the point of contact if the angle of curvature and the length of the wave guide is correct.

The gage blocks shown are designed specifically for a rectangular wave guide of predetermined dimensions. If articles having a different size or shape are to be gaged, the blocks 11 and 12 and blocks 26 and 27 may be easily replaced. However, the blocks which are used in place of gage blocks 11 and 12 must be identical with those used to replace blocks 26 and 27. In other words, the blocks secured to the base 13 must at all times be identical in size and shape to the blocks attached to the pivoted gage arm 23, but so long as they are identical in size or shape, any type block may be used.

Block 34 secured to the base 13 serves as a support for plate 29 and as a stop to prevent the gage arm 23 from rotating far enough to strike the base 13 and damage gage blocks 11 and 12 and 26 and 27.

Although this invention has been described for use in conjunction with a wave guide, it is obvious that the device could be used for determining accurately the angle of curvature of other objects.

It is to be understood that the above described arrangement is merely illustrative of the application of the principles of this invention. Numerous other arrangements may be readily devised by those skilled in the art which will embody the principles of the invention and fall within the spirit and scope thereof as defined by the appended claims.

What is claimed is:

1. A gaging device to ascertain the accuracy of contour and length of objects having a specified angle of curvature and terminating in linear sections of a specified length comprising a base, means for holding one end of said objects to be measured in position on said base, a member rotatably mounted on said base, the center of rotation of the member being located at the center of curvature of said objects to be measured, and a gage attached to said member and adapted to contact the other end of the objects to be measured for contour and length.

2. A device for ascertaining contours of objects having known angles of curvature and terminating in linear sections of a specified length comprising a base, means for positioning said objects to be gaged on said base, an arm rotatably mounted on said base and having its center of rotation located at the center of curvature of said objects to be measured, a gage secured to said arm, and means for locking said arm in any of a plurality of predetermined positions to ascertain any of a plurality of said angles of curvature of said object so that said gage engages said objects to determine if it is of a predetermined contour.

3. A device for ascertaining the contours of objects having specified angles of curvature and terminating in linear sections of specified length, comprising a base, means for positioning said object to be measured on said base, a plate attached to said base, an arm rotatably mounted on said base, means interconnecting said plate and said arm for locking said arm in any of a plurality of predetermined positions to ascertain any of a plurality of said angles of curvature of said object with respect to said plate, and a gage secured to said arm to engage the end of the object to be measured to determine if it is of a predetermined contour, said gage being identical in size and shape to said positioning means.

4. A device for ascertaining the contour of articles having a specified angle of curvature and terminating in linear sections of specified lengths comprising a base, a plate secured to said base, a perpendicular stud member attached to said base, a rotatable link one end of which is rotatably secured to the stud member, a gage arm movable with respect to the plate and attached to the other end of said rotatable link, means interconnecting said gage arm and said plate for locking said gage arm in a predetermined position with respect to said plate, a gage attached to said gage arm adapted to engage the end of the article removed from the base, and means for limiting rotation of said gage arm to avoid damage to said gage.

5. A device for measuring the angle of curvature of a partially arcuate wave guide section terminating in linear sections of a predetermined length comprising a base, means for positioning said wave guide on said base in any of a plurality of positions depending upon the dimensions to be measured, a gage arm rotatably mounted on said base, a gage secured to said gage arm which engages the free end of the wave guide, said gage being identical in size and shape with said positioning means, and means for locking said gage arm in a predetermined position.

6. A contour determining device for partially arcuate wave guide sections terminating in linear sections of known lengths comprising a base, a first removable gage for positioning the section of wave guide on said base, an arm rotatably mounted on said base, a second removable gage identical in size and shape with the said first gage and attached to said arm and adapted to engage the free end of the wave guide section, and means for locking said arm in a predetermined position.

7. In a device for determining the length and contour of an arcuate wave guide terminating in linear sections of a known length, a base, a first gaging means removably attached to said base for positioning said wave guide in any of a plurality of desired positions, a plate secured to said base, an arm rotatably mounted on said base and movable with respect to the plate, a second removable gaging means identical in size and shape to said first gaging means and attached to said arm, said second gaging means being adapted to engage the free end of the wave guide, and a pair of removable pins extending through said plate and into contact with opposite sides of the said arm to lock the gage carrying arm in a predetermined position.

8. A length and contour gage for partially arcuate wave guide sections terminating in linear sections of known lengths comprising a base, means for positioning said wave guide on said base in any of a plurality of positions depending upon the dimensions to be measured, a plate attached to said base and having pairs of apertures at a plurality of predetermined angular positions, an arm movable with respect to the plate and rotatably mounted on said base, a gage secured to said arm and adapted to contact the end of the wave guide removed from the base, and removable pins adapted to be placed in pairs of said apertures of said plate to contact opposite sides of said arm to lock said arm in any of the predetermined angular positions.

9. A contour and length determining device for partially arcuate wave guide sections terminating in linear sections of known lengths which comprises a base, a first gage removably attached to said base to position said wave guide on said base in any of a plurality of positions depending upon the dimensions to be measured, a plate secured to said base containing pairs of apertures located at a plurality of predetermined positions, an upright stud secured to said base, an offset member one end of which is rotatably mounted to said stud, an arm secured to the other end of said offset member and rotatable to any of the predetermined positions of the pairs of apertures in said plate, means coacting with a pair of apertures in said plate and with said arm for locking said arm in any of said predetermined positions, and a second gage identical in size and shape to the first gage removably attached to said arm and adapted to engage the free end of said wave guide to determine the length and contour thereof.

10. In a contour gage for E and H wave guides having straight end portions and a curved portion therebetween, a base, means having E and H wave guide gages for positioning wave guides in accordance with the mode of wave transmission, a first stud member mounted on and perpendicular to said base and equal in length to one of said straight end portions, a second stud member rotatably attached to said first stud member and equal in length to the other of said straight end portions, a gage arm secured at one end to said second stud member so that the said second stud member is perpendicular to the said gage arm and the pivot point of the arm is located at the center of curvature of the curved portion of the wave guide being measured, means secured to said gage arm and including E and H wave guide gages for engaging the end of the wave guide removed from the base, an indicating plate perpendicularly secured to the base and adjacent the path of travel of the said gage arm, said plate having a plurality of pairs of apertures in predetermined locations therein, a pair of sleeves insertable in said pairs of apertures according to the lengths and contours of wave guides to be measured, and a pair of pins movable in said pair of positioned sleeves to engage and lock the gage arm in a selected one of said predetermined positions.

References Cited in the file of this patent

UNITED STATES PATENTS

| | | |
|---|---|---|
| 227,425 | Geiger | May 11, 1880 |
| 864,145 | Anderson | Aug. 27, 1907 |
| 1,380,945 | Brown | June 7, 1921 |
| 1,644,967 | Wettrich | Oct. 11, 1927 |
| 1,998,352 | Bachmann | Apr. 16, 1935 |
| 2,309,891 | Fisk | Feb. 2, 1943 |
| 2,359,018 | Balk | Sept. 26, 1944 |
| 2,376,372 | Martinec | May 22, 1945 |
| 2,403,420 | Willingham | July 2, 1946 |
| 2,409,280 | Hohwart | Oct. 15, 1946 |
| 2,464,444 | Gantz | Mar. 15, 1949 |

FOREIGN PATENTS

| | | |
|---|---|---|
| 302,234 | Germany | Apr. 16, 1920 |

OTHER REFERENCES

"Machinery," page 794, June 1925.